Feb. 9, 1971 D. W. HOOLE ET AL 3,562,130
PLASTIC ION SENSITIVE COMBINATION ELECTRODE
Filed April 12, 1968
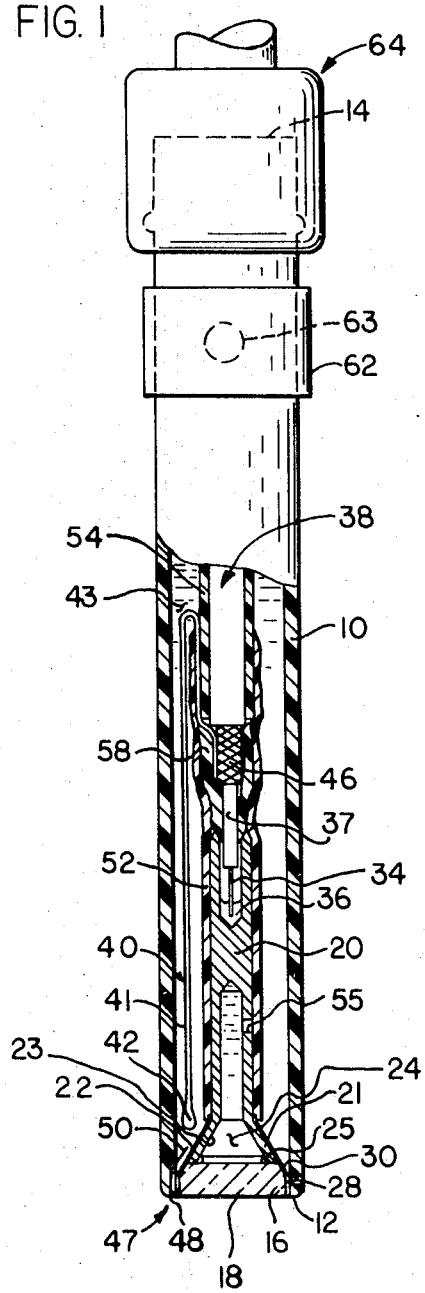
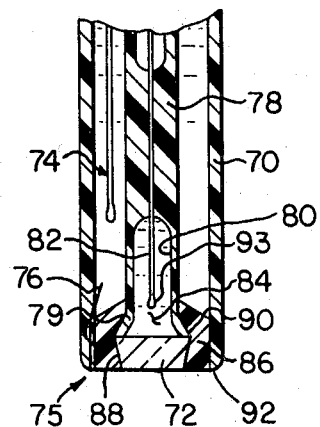
INVENTORS
DUANE W. HOOLE
GERALD L. KLEIN
BY
ATTORNEY United States Patent Office 3,562,130
Patented Feb. 9, 1971

3,562,130
PLASTIC ION SENSITIVE COMBINATION ELECTRODE
Duane W. Hoole, Huntington Beach, and Gerald L. Klein, Orange, Calif., assignors to Beckman Instruments, Inc., a corporation of California
Filed Apr. 12, 1968, Ser. No. 720,994
Int. Cl. G01n 27/46
U.S. Cl. 204—195                                    9 Claims

ABSTRACT OF THE DISCLOSURE

Ion sensitive combination electrochemical electrodes formed primarily of plastic without the use of glass within the structures are disclosed. In one embodiment an ion sensitive membrane such as a $LaF_3$ crystal is in contact with a copper tube containing an electrolyte, the copper tube being bonded to the $LaF_3$ crystal. The copper tube and lateral surface of the $LaF_3$ are coated with a plastic to provide electrical insulation and a seal against liquid. A second embodiment includes a plastic tube supporting a silver chloride coated silver wire with an electrolyte being disposed within the tube in contact with a $LaF_3$ crystal. A compression ring is formed about the plastic tube and the $LaF_3$ crystal to provide a biasing force holding the tube and the crystal in a sealed relationship. In each embodiment a flush sensing surface including a liquid junction structure is provided.

BACKGROUND OF THE INVENTION

Field of the invention

The present invention relates to electrochemical electrodes and more particularly to ion sensitive nonglass combination electrodes.

Description of the prior art

Combination electrodes comprising a sensing portion and reference portion incorporated in a glass structure are well known in the art. The usual structure comprises a glass ion sensitive membrane in contact with a first electrolyte which in turn is in contact with a metal or metal and metal salt to form a half cell for establishing a potential. The reference portion of the combination electrode usually comprises a reference internal half cell such as a silver chloride coated silver wire immersed in a second electrolyte which contacts a sample test solution by leaking through a liquid junction structure. However, because of inherent disadvantages of glass, such as fragility and difficulty in sealing nonglass elements to glass, glass in many cases is not a desirable structural material. To our knowledge, prior to our invention there were no commercially available nonglass, liquid filled combination electrodes and all combination electrodes that are presently available are constructed primarily of glass with the majority having hydrogen ion sensing glass membranes.

Recently specific ion electrodes of plastic structural material have appeared having an ion sensitive structure or membrane comprising a single crystal or polycrystalline structure of a compound containing the element whose ion is to be detected. Examples of such compounds are lanthanum fluoride for detection of fluoride ions, silver chloride for the detection of chloride ions, silver bromide for the detection of bromide ions, and silver iodide for the detection of iodide ions. However, these specific ion sensing membranes have been used only in single electrodes, that is, sensing electrodes.

In attempting to make a nonglass combination electrode difficulties have been encountered in the areas of electrolyte leakage, shielding, insulating, reliability, and size. These difficulties have in the past effectively thwarted efforts to develop commercially practical nonglass combination-type electrodes.

OBJECTS

An object of the present invention is to provide an operable nonglass combination electrode.

Another object of the present invention is to provide a nonglass combination electrode that is reasonably sized, reliable and relatively inexpensive.

Still another object of the present invention is to provide nonglass combination electrode which has good shielding against capacitive electrical effects, is properly sealed, and is effectively insulated.

Yet another object of the present invention is to provide a nonglass combination electrode which is capable of making measurements in exceedingly small amounts of sample solution.

Other objects and many of the intended advantages of this invention will become more readily apparent to those skilled in the art as the same becomes better understood by reference to the following detailed description of preferred embodiments of the invention when read in connection with the accompanying drawing.

BRIEF DESCRIPTION OF THE DRAWING

FIG. 1 is a partial sectional view of one form of the invention; and

FIG. 2 is a fragmentary sectional view of a second form of the invention.

DESCRIPTION OF THE PREFERRED EMBODIMENTS

Referring now to FIG. 1 there is illustrated an ion sensitive combination electrode comprising a container 10, which may be tubular in form, having oppositely disposed open ends 12 and 14. The tube may be of any suitable nonglass, nonconductive material but is preferably of a plastic substantially chemically inert to prospective test solutions and electrolytes. Suitable plastics are polyethylene, polypropylene or fluorocarbon. Located within the container 10 and disposed at the end 12 is an ion sensitive structure or membrane 16 whose sensing surface 18 is flat and flush with the end 12 of the container so that a planar sensing surface is formed. The ion sensitive structure may be a single crystal lanthanium fluoride membrane which is suitable for fluoride ion detection. A calcium fluoride membrane may also be used for fluoride ion detection. A silver chloride membrane may be used to detect chloride ions, a silver bromide membrane to detect bromide ions and a silver iodide membrane to detect iodide ions. The membrane should be substantially insoluble in prospective test solutions and electrolytes to be used. Additionally, though not to be considered limiting the invention in any way, it is believed the membrane should have a mobile ion so as to provide the transport mechanism for detection of the desired specific ion. Based on theoretical considerations, it is not believed necessary that the mobile ion be of the same element as that being detected.

A nonglass tubular body 20 of copper or other suitable metal and having one end portion 21 flared to form a hollow frustum is coaxially positioned within the container 10 and juxtaposed the membrane 16. The inner surface 23 of the tubular body 20 and the ion sensitive membrane 16 form a reservoir containing a suitable sensing electrolyte 24 for electrolytically connecting the membrane 16 and the tubular body 20 so as to form a sensing half cell.

One of the major problems in constructing combination electrodes of the type herein disclosed is that the reservoir holding the sensing electrolyte must be properly sealed so as to prevent the leakage of electrolyte and thereby drift of the electrical potential established across the sensing portion of the electrode.

The leakage problem may be solved as shown in FIG. 1 by hermetically sealing the ion sensitive membrane 16 to the tubular body 20. This is accomplished by using elements having similar coefficients of thermal expansion and by applying a somewhat resilient bonding agent 25 thereto. For example, copper has a coefficient of thermal expansion of about $16 \times 10^{-6}$ while the coefficient of thermal expansion of a crystal of lanthanum fluoride is $15 \times 10^{-6}$ or $19 \times 10^{-6}$ depending upon which crystal axis is selected for the measurement. Thus, under temperature cycling, expansion and contraction at the junction of these two elements is maintained at a minimum. While these materials have a relatively small difference between their coefficients of thermal expansion, considerably greater differences can be tolerated due to the use of the resilient or semi-rigid bonding agent 25 (the thickness of which is exaggerated in the drawing) applied at the junction to provide the sealing. A resilient or semi-rigid bonding agent is one that suitably bonds the elements and, additionally, provides sufficient flexibility to allow slight movements of the elements such as those caused by environmental temperature or pressure variations. One such bonding agent is sold under the trade name "Omniseal" Type 3 by Curtis Associates of San Diego, Calif., and is a high vacuum silica sealing compound. Application of the "Omniseal" bonding agent is in accordance with the manufacturer's instructions. Other bonding agents having the requisite flexibility may also be used. Other methods may be utilized to provide a suitable seal between these elements such as a mechanical means illustrated in the FIG. 2 embodiment explained hereinafter.

When the ion to be detected is the fluoride ion and when the tubular body 20 is comprised of copper, the electrolyte 24 preferably contains fluoride ions and copper ions to establish proper electrochemical potentials.

In order to electrically and chemically insulate the sensing portion of the combination electrode from the reference portion of the electrode, the outer surface 22 of the tubular body 20 and the lateral surface 28 of the membrane 16 are coated with a plastic material 30 such as a fluorocarbon which may be Du Pont "Teflon" plastic. The use of the plastic coating insures that electrical insulation exists between the tubular body 20 and the reference portion of the electrode, and between the membrane 16 and the reference portion. Additionally, the plastic coating insures that trace amounts of test solution do not become entrapped along the lateral surface of the membrane to cause erroneous signals or drifting if the electrode should be transferred from one test solution to another having different ion concentrations. The "Teflon" plastic coating is applied in accordance with the manufacturer's instructions and generally entails spraying a coating upon the surfaces, baking at a particular temperature for a period of time, and then repeating the process until a nonporous surface coating is produced; it is preferable that thickness of the coating be kept to a minimum.

To complete the sensing portion of the combination electrode an electrical conductor 34 is suitably connected to the tubular body 20 such as by embedding the conductor in solder 36. The remainder of conductor 34 is surrounded by an insulator 37 and extends the length of the container 10 having an end (not shown) adapted to connect to an appropriate high impedance voltage indicating or recording device (not shown). The conductor 34 and insulator 37 may be a part of a coaxial cable 38.

The reference portion of the combination electrode comprises a reference internal half cell 40 such as a silver wire 41 coated at an end with silver chloride 42 immersed in an appropriate electrolyte 43. The silver wire 41 is connected at the other end to a conductor 46 which may be the outer conductor of coaxial cable 38. The reference half cell is located within an annular reservoir formed between the container 10, the tubular body 20 and the coaxial cable 38. This reservoir contains the reference electrolyte 43.

The insulation and sealing problems in making a combination electrode are created by the necessity of electrically and chemically isolating the reference portion of the combination electrode from the sensing portion. Thus the metallic tubular body 20 must be completely insulated from the reference electrolyte 43, and the sensing electrolyte 24 within the tubular body must not be allowed to leak to the reference electrolyte 43 since in either circumstance the sensing ability of the electrode is impaired. By the present invention, this insulating and sealing solution is relatively simple, inexpensive and reliable. Additionally, the final structure is relatively compact, that is, has a relatively small cross sectional area such as achieved with conventional glass combination electrodes.

A liquid junction structure 47, such as disclosed in copending application Ser. No. 720,802 assigned to the assignee of the present application, is formed at the end 12 of the container 10 with an opening 48 near the flush surface 18. An asbestos or linen fiber 50 restrained in the container 10 provides the minute passageway necessary to connect the reference electrolyte 43 and the test solution exterior of the electrode. It is to be noted that by placing the liquid junction opening 48 near the flat surface 18, the electrode is able to make ion detection in very small quantities of test solutions, i.e., even as small as a sample smeared upon a glass slide. Additionally a flat sensing surface prevents air bubbles from lodging adjacent the surface and causing erroneous measurements. Prior art specific ion sensing electrodes having nonplanar surfaces are often prone to retain air bubbles.

To further improve the insulation reliability, portions of the electrode may be covered with shrink tubes 52 and 54 about the sensing half cell 20 and the coaxial cable 38, respectively. The shrink tube preferred is comprised of two layers, a polyolefin outer layer and a polyethylene inner layer or liner. Upon being heated, the polyethylene melts and flows to conform to the surface being covered while the polyolefin contracts about the surface. The melt-flow characteristics of the polyethylene liner coupled with the pressure induced by the contracting polyolefin causes surface irregularities at the desired interface to be filled with the melted polyethylene. Upon cooling a tight mechanical bond is effected between the two plastic layers. Further, the surface of the tube to be sealed may be wiped with a light film of silicon grease which serves to fill surface irregularities too small to be pentrated by the melted polyethylene. Any suitable shrink tube may be used such as that sold under the trade name "Thermofit SCL" by Rayclad Tubes Inc. of Menlo Park, Calif. It is noted that a small opening 55 in the tubular body 20 is provided for filling the reservoir with the sensing electrolyte 24. Once the sensing electrolyte is inserted, the opening 55 is sealed. The shrink tube 52 may serve this purpose in addition to insulating the tubular body. Since the shrink tube is heated during the sealing and insulating operation, so is the sensing electrolyte 24, which upon cooling is below environmental or atmospheric pressure. This pressure differential serves to improve the seal between the tubular body 20 and the ion sensitve membrane 16.

Formed about the conductor 46 where it contacts the silver wire 40 is a solder sleeve 58 comprising a plastic tube with an inner solder coating (not shown). This tube is placed over the connection between the conductor 46 and the silver wire 41; upon the application of heat the solder liquefies to solder the conductor and the wire together, and the palstic contracts about the solder forming an insulation. An additional shrink tube (not shown) may be positioned over the connection to further seal and insulate.

Adjacent the end 14 of the container 10 is an elastic band 62 to cover an opening 63 which allows the replenishing of the reference electrolyte 43. The end 14 is suitably enclosed with a cap assembly 64 such as the one disclosed in copending application Serial No. 652,298, now Patent No. 3,476,672 assigned to the assignee of the instant application.

Shielding of the sensing portion of the electrode and conductor 34 is accomplished by having them completely surrounded except for the sensing surface 18 by the reference electrolyte 43 and conductor 46, respectively.

Referring now to FIG. 2 there is shown another preferred embodiment of the invention comprising a nonglass, nonconductive container 70, an ion sensitive membrane 72, a reference half cell 74 and a liquid junction 75 having a linen fiber 76. Additionally, the embodiment comprises a partial tubular body 78 of nonconductive, nonglass material such as plastic having a flared end 79 and a recess 80 in which a wire 82 coated at its tip 83 with silver chloride is mounted. A suitable electrolyte 84 is contained within the recess 80 communicating the ion sensitive membrane 72 and the wire 82. A plastic compression ring 86 is used to bias in a sealing relationship the membrane 72 and the body 78 by being molded about the lateral surfaces 88 and 90 of the membrane 72 and the body 78, respectively. As shown the lateral surfaces are geometrically shaped as oppositely disposed conical frustums; hence the molded compression ring 86 upon cooling provides forces acting parallel to the longitudinal axis of the electrode and upon the lateral surfaces biasing the membrane 72 and body 78 together to provide a seal against leakage of the electrolyte 84. A similar construction may be used in the FIG. 1 embodiment if it is found desirable and thus avoid the use of the bonding agent 25.

The compression ring is preferably applied about the lateral surfaces 88 and 90 by placing the body 78 and ion sensitive membrane 72 in a mold and injecting plastic under pressure about the lateral surfaces. Upon cooling the compression ring solidifies and contracts about the surfaces. The connected assembly is then inserted into the container 70 so that the ion sensitive membrane 72 is flush with an end 92 of the container.

It will be obvious to those skilled in the art that various modifications may be made to the specific exemplary embodiments of the invention described. While particular embodiments have been dicsussed, it will be understood that the invention is not limited thereto but is defined by the scope of the appended claims.

We claim:
1. A combination electrochemical electrode comprising:
  a container of nonconductive nonglass material having an open end;
  an ion sensitive structure having its lateral surface supported by the open end of said container;
  a metal tube in said container spaced from the wall thereof and sealed to said ion sensitive structure, said tube being covered by a nonconductive nonglass material;
  a reservoir in said tube adjacent to said ion sensitive structure, said reservoir containing a sensing filling solution;
  a plastic coating covering said lateral surface of said ion sensitive structure and providing an insulating seal between said structure and the wall of said container;
  an internal half cell positioned in the space between the wall of said container and said metal tube; and
  liquid junction means providing a leak passage between said space and the exterior of said container.

2. An electrode as claimed in claim 1 wherein, said sensing filling solution contains an ion of the metal of said metal tube.

3. An electrode as claimed in claim 1 wherein, said metal tube has a coefficient of thermal expansion similar to the coefficient of thermal expansion of said ion sensitive structure.

4. An electrode as claimed in claim 3 wherein,
  said metal tube material is copper; and
  said ion sensitive structure is a $LaF_3$ crystal.

5. An electrode as claimed in claim 1 wherein said material covering said metal tube is a plastic shrink tube.

6. In a combination electrochemical electrode for measuring the ion concentration of solutions, a container of nonconductive material having an open end, an elongated element coaxially positioned within said container and spaced therefrom to provide an annular electrolyte reservoir therebetween, said element having a nonconductive outer layer and a recess therein opening adjacent to said open end of said container, an ion sensitive structure sealed to said element so as to close said recess and provide therein a second electrolyte reservoir, a second internal half cell in said annular reservoir, and liquid junction means providing a leak passage between said annular reservoir and the exterior of said container, the improvement which comprises said container being formed of a plastic material, said element being formed of metal and being covered by a plastic material providing said nonconductive outer layer, said metal element providing said first internal half cell, and sealing means sealing the lateral surface of said ion sensitive structure to the inner wall of said container adjacent to said open end thereof.

7. A combination electrochemical electrode comprising:
  a container of nonconductive nonglass material having an open end;
  an ion sensitive structure adjacent to said open end of said container;
  a nonglass element in said container spaced from the wall thereof, an electrolyte reservoir in said element adjacent to said open end of said container, said ion sensitive structure closing said reservoir, said element including an electrically conductive portion adapted to contact electrolyte in said reservoir;
  a nonglass nonconductive compression ring adjacent said open end of said container biasing said structure into sealing relationship with said element;
  an interal half cell positioned in the space between the wall of said container and said element; and
  liquid junction means providing a leak passage between said space and the exterior of said container.

8. An electrode as claimed in claim 7 wherein, said element comprises a plastic tube and said electrically conductive portion comprises an internal sensing half cell in said tube and supported thereby.

9. An electrode as claimed in claim 8 wherein,
  said plastic tube has a flared end;
  the lateral surface of said ion sensitive structure is tapered, diverging toward said flared end; and
  said compression ring is disposed about said flared end and said lateral surface.

References Cited

UNITED STATES PATENTS

| | | | |
|---|---|---|---|
| 3,049,118 | 8/1962 | Arthur et al. | 204—195.1 |
| 3,431,182 | 3/1969 | Frant | 204—195 |
| 3,492,216 | 1/1970 | Riseman et al. | 204—195 |

TA-HSUNG TUNG, Primary Examiner

U.S. Cl. X.R.

204—286